(12) United States Patent
Shin et al.

(10) Patent No.: US 8,026,989 B2
(45) Date of Patent: Sep. 27, 2011

(54) LIQUID CRYSTAL DISPLAY PANEL

(75) Inventors: Kyoung-Ju Shin, Hwaseong-si (KR);
Hyeong-Cheol Ahn, Seoul (KR);
Jin-Oh Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 205 days.

(21) Appl. No.: 12/393,758

(22) Filed: Feb. 26, 2009

(65) Prior Publication Data
US 2009/0237579 A1 Sep. 24, 2009

(30) Foreign Application Priority Data
Mar. 21, 2008 (KR) .................. 10-2008-0026435

(51) Int. Cl.
G02F 1/1343 (2006.01)
G02F 1/1335 (2006.01)
(52) U.S. Cl. .................................. 349/38; 349/144
(58) Field of Classification Search .................. None
See application file for complete search history.

(56) References Cited

U.S. PATENT DOCUMENTS

| | | | | |
|---|---|---|---|---|
| 7,324,170 B2* | 1/2008 | Baek | ................. | 349/38 |
| 7,557,886 B2* | 7/2009 | Lee et al. | ........... | 349/141 |
| 2007/0030407 A1* | 2/2007 | Kwak et al. | ........ | 349/38 |
| 2008/0030636 A1* | 2/2008 | Huang et al. | ....... | 349/38 |
| 2008/0062341 A1* | 3/2008 | Tanaka | ............... | 349/38 |
| 2008/0143930 A1* | 6/2008 | Jin et al. | ............ | 349/96 |

* cited by examiner

*Primary Examiner* — Tina Wong
(74) *Attorney, Agent, or Firm* — Innovation Counsel LLP

(57) ABSTRACT

A liquid crystal display (LCD) panel employed in an LCD device includes an array substrate and an opposite substrate. The array substrate includes a pixel electrode formed in a pixel area including a first sub-pixel area and a second sub-pixel area. The opposite substrate is spaced apart from the array substrate to receive a liquid crystal layer. The opposite substrate includes a first common electrode formed in correspondence with the pixel area, and a second common electrode being floated in correspondence with the second sub-pixel area to form a coupling capacitor.

17 Claims, 12 Drawing Sheets

LIQUID CRYSTAL DISPLAY PANEL

PRIORITY STATEMENT

This application claims priority under 35 U.S.C. §119 of Korean Patent Application No. 2008-26435, filed on Mar. 21, 2008 in the Korean Intellectual Property Office (KIPO), the disclosure of which application is herein incorporated by reference in its entirety.

BACKGROUND

1. Field of Invention

The present disclosure of invention relates to liquid crystal display (LCD) panels such as employed in an LCD monitor.

2. Description of the Related Technology

A liquid crystal display (LCD) device displays an image by controlling light transmittance according to voltages applied across a liquid crystal layer where the latter is interposed between two substrates.

In LCD devices, light is transmitted toward a direction in which the light is not shielded (blocked) by liquid crystal molecules of the liquid crystal layer. Since the realized image is dependant on angle of light transmission, the useful viewing angles of the LCD device are generally narrower than those of other types of displays. A so-called vertical alignment (VA) mode LCD device has been developed in order to try to realize wider viewing angles.

The VA mode LCD device includes a liquid crystal layer that exhibits a negative type dielectric constant anisotropy. The liquid crystal layer is sealed between two substrates that have undergone a vertical alignment process. The liquid crystal molecules of the liquid crystal layer have homotropic alignment characteristics. During operation, when a voltage is not applied to two substrates, molecules in the liquid crystal layer automatically aligns in a vertical direction with respect to a surface of a substrate so as to block light transmission and thereby display a black pixel. When a predetermined voltage is applied across the two substrates, molecules in the liquid crystal layer align in a horizontal direction with respect to the surface of the substrate so as to transmit light and thus display a white or fully lit pixel. When a voltage that is less than the predetermined voltage is applied to two substrates, molecules in the liquid crystal layer align in an inclined direction with respect to the surface of the substrate to thereby display a gray pixel.

The LCD device generally has a disadvantage of a narrow viewing angle. In order to overcome the disadvantage, a patterned vertical alignment (PVA) mode and a super patterned vertical alignment (SPVA) mode have been proposed wherein each pixel is subdivided into multiple domains and different voltages drive the respective multiple domains. The PVA mode is a technology in which a common electrode formed on an upper substrate and a pixel electrode formed on a lower substrate are patterned to realize multiple domains. The SPVA mode is a technology in which one pixel is divided into a plurality of sub-pixels to apply different pixel voltages to the divided sub-pixels in response to a single applied voltage. As an example of the SPVA mode, a coupling capacitor (CC-SPVA) is used to apply a different pixel voltage to the sub-pixel that is driven via the coupling capacitor as opposed to the sub-pixel that is directly driven.

In other words, in a CC-SPVA mode LCD device, a first sub-pixel directly receives a pixel voltage supplied from a data line, and a second sub-pixel receives a smaller voltage due to voltage division provided by the coupling capacitor. While viewing angle may be widened when the CC-SPVA mode LCD device is employed in a product, the product may have disadvantages such as low overall light transmittance and the generation of afterimages.

SUMMARY

According to one aspect of the present disclosure, an LCD panel includes an array substrate and an opposite substrate. The array substrate includes a pixel electrode formed in a pixel area including a first sub-pixel area and a second sub-pixel area. The opposite substrate is spaced apart from the array substrate and disposed to contain a liquid crystal layer therebetween. The opposite substrate includes a first common electrode formed in correspondence with the pixel area, and a second common electrode being floated in correspondence with the second sub-pixel area to thereby form a coupling capacitor.

According to one aspect, an LCD panel is provided which includes a switching element, a first liquid crystal capacitor, a second liquid crystal capacitor and a coupling capacitor. The switching element includes a control terminal connected to a gate line, and an input terminal connected to a data line crossing the gate line. The first liquid crystal capacitor includes a first electrode connected to an output terminal of the switching element, and a second electrode receiving a common voltage. The second liquid crystal capacitor includes a first electrode connected to an output terminal of the switching element. The coupling capacitor includes a first electrode connected to a second electrode of the second capacitor, and a second electrode receiving the common voltage or a virtualized version of the common voltage.

According to an aspect of the disclosure, a coupling capacitor is formed in an opposite substrate of a Liquid Crystal Display (LCD) device with multiple dielectric layers, so that light transmittance may be enhanced and afterimages may be reduced or prevented.

BRIEF DESCRIPTION OF THE DRAWINGS

The above and other features and advantages of the present disclosure of invention will become more apparent by describing in detailed example embodiments thereof with reference to the accompanying drawings, in which.

DETAILED DESCRIPTION

Figure 1:
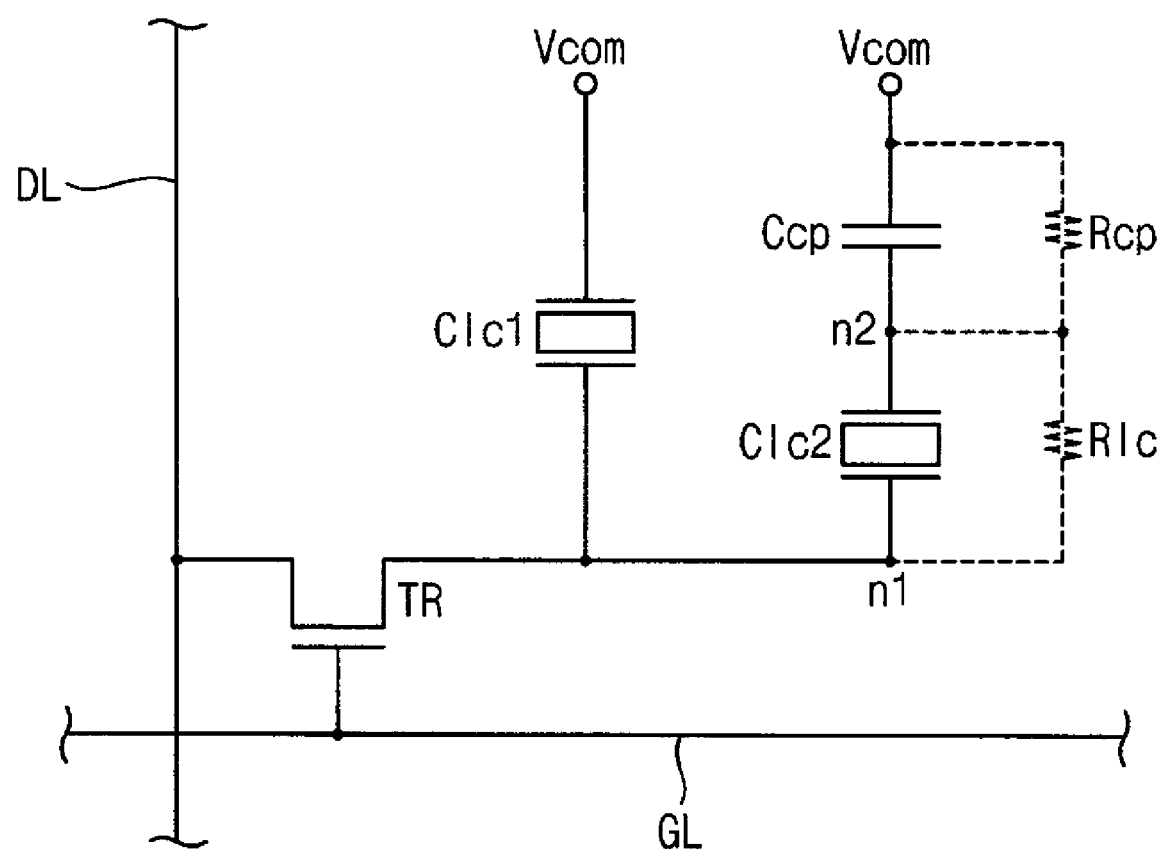
FIG. 1 is an equivalent circuit diagram illustrating a liquid crystal display (LCD) panel according to one embodiment.

The present disclosure of invention makes reference to the accompanying drawings, in which example embodiments are shown. The disclosed concepts may, however, be embodied in many different forms and should not be construed as limited to the example embodiments set forth herein. Rather, these example embodiments are provided so that this disclosure will be thorough and complete, and will fully convey the concepts to those skilled in the pertinent art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limiting the overall disclosure to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosure.

Unless otherwise defined, all terms (including technical and scientific terms) used herein have the same meaning as commonly understood by one of ordinary skill in the pertinent art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is an equivalent circuit diagram illustrating a liquid crystal display (LCD) panel according to one embodiment of the present disclosure.

Referring to FIG. 1, an LCD panel includes a plurality of pixels such as the illustrated sample pixel P. The pixel P includes a switching element TR (e.g., a thin film transistor), a first liquid crystal capacitor Clc1, a second liquid crystal capacitor Clc2 and a coupling capacitor Ccp that couples the second liquid crystal capacitor Clc2 to a common voltage Vcom.

The switching element TR includes a control terminal (hereinafter, a gate electrode) that is electrically connected to a gate line GL, an input terminal (hereinafter, a source electrode) electrically connected to a data line DL crossing the gate line GL, and an output terminal (hereinafter, a drain electrode) electrically connected to a first terminal of the first liquid crystal capacitor Clc1 and to a first terminal of the second liquid crystal capacitor Clc2. An opposed or second terminal of the first liquid crystal capacitor Clc1 receives a common voltage Vcom. A second terminal of the second liquid crystal capacitor Clc2 is connected to a first terminal of the coupling capacitor Ccp. A second or opposed terminal of the coupling capacitor Ccp receives the common voltage Vcom.

The driving type of the illustrated pixel P is now described.

A data voltage is applied to the data line DL, and a selectively activating gate signal is applied to the gate line GL. For example, a range of the data voltage may be about 0V to about 12V, and the common voltage, Vcom, may be 6V-Vkb, wherein 'Vkb' is a kickback voltage.

The applied data voltage is charged onto the first liquid crystal capacitor Clc1 as a first pixel voltage $V_H$ by passage of charging current through the switching element TR. The first pixel voltage $V_H$ charged in the first liquid crystal capacitor Clc1 is also charged across the series combination of the second liquid crystal capacitor Clc2 and the coupling capacitor Ccp.

Thus, a second pixel voltage $V_L$ that is less than the first pixel voltage $V_H$ is charged across the second liquid crystal capacitor Clc2. The coupling capacitor Ccp may be designed so that the second pixel voltage $V_L$ is about 0.6 times to about 0.7 times the first pixel voltage $V_H$.

The capacitors may have parasitic internal leakage resistances. In order to cause the second pixel voltage $V_L$ to be about 0.6 times to about 0.7 times the first pixel voltage $V_H$, the capacitor Ccp has to have a larger capacitance than that of the second liquid crystal capacitor Clc2. As a result of this, the resistance of an internal resistor Rcp of the coupling capacitor Ccp typically tends to be greater than that of the internal resistor Rlc of the second liquid crystal capacitor Clc2 (Rcp>Rlc). Thus, when a voltage other than Vcom develops at the second node 'n2' (the node that defines a floating common electrode for the second liquid crystal capacitor Clc2), a leakage current flows through the low resistance Rcp and toward or away from the second liquid crystal capacitor Clc2 depending on whether the voltage at n2 is above or below Vcom. The voltage developed at the second node 'n2' tends to be substantially equal to an average voltage '6V' between the high and low magnitudes provided at the drain electrode (i.e., about 0 V to about 12 V). More specifically, the n2 voltage develops as an average voltage of about 6V due to the difference between the kickedback voltage (i.e., 6V-Vkb) applied to the coupling capacitor Ccp and the drain voltage (i.e., about 0 V to about 12 V) applied to the first node 'n1'. Given that the voltage of the second node 'n2' is substantially equal to the average voltage '6V', an asymmetric current discharge error can develop between a positive polarity drive signal and a negative polarity drive signal with respect to the common voltage Vcom (i.e., 6 V) due to the delay time constant associated with the leakage resistance Rcp. As a result, afterimages may be generated by a remaining direct current component of the leakage current that does not equally dissipate when driven by opposed drive polarities. Techniques are disclosed herein for increasing Rcp and thereby reducing after images.

Figure 2:
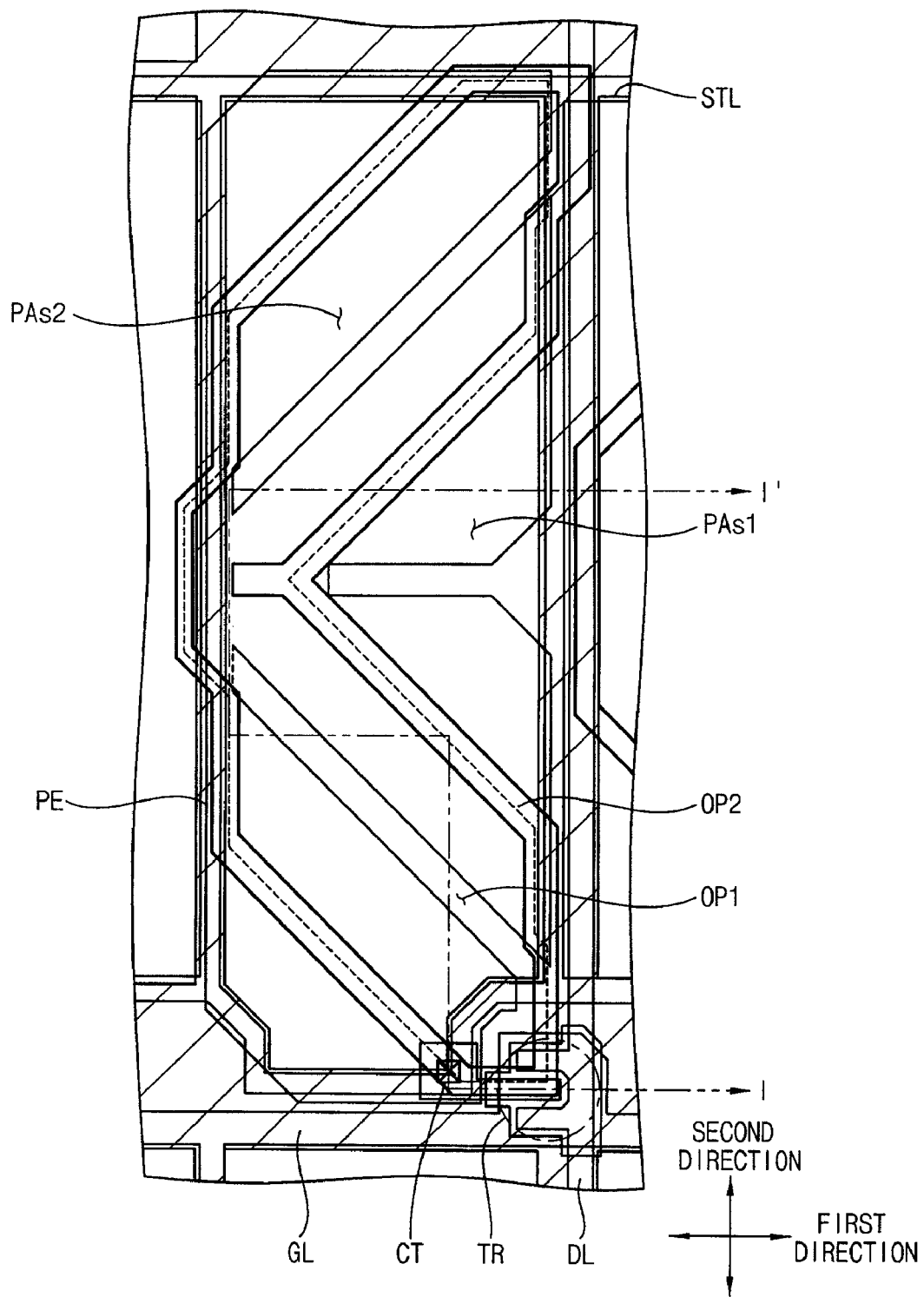
FIG. 2 is a plan view illustrating an LCD panel according to one embodiment.
Figure 3:
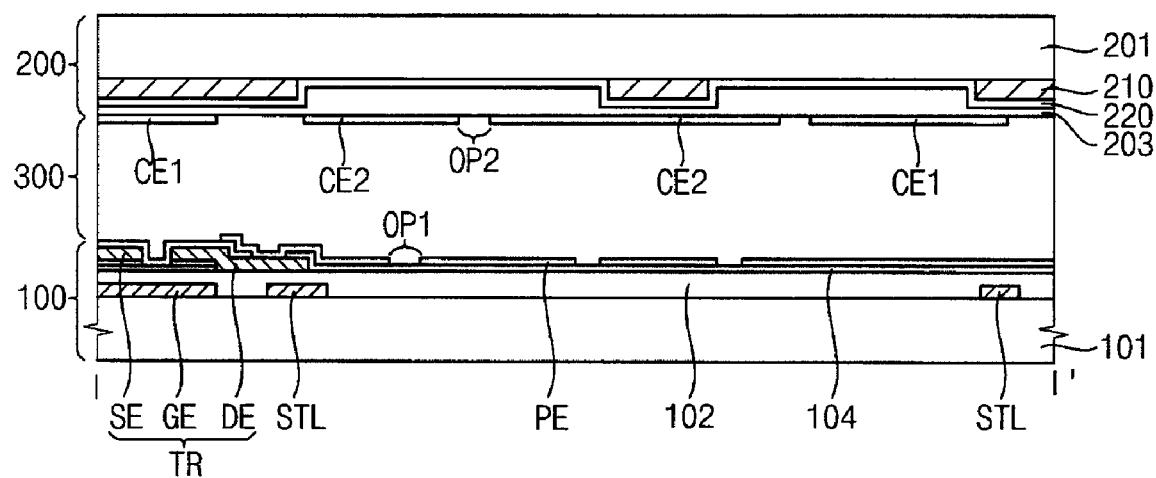
FIG. 3 is a cross-sectional view taken along a line I-I' of FIG. 2.

FIG. 2 is a plan view illustrating an LCD panel according to an embodiment of the present disclosure. FIG. 3 is a cross-sectional view taken along a line I-I' of FIG. 2.

Referring to FIGS. 2 and 3, the LCD panel includes a TFT array supporting substrate 100 and an opposite substrate 200 joined in spaced apart relation with the array substrate 100 and having a liquid crystal layer 300 interposed between the substrates 100 and 200.

The array substrate 100 includes a light passing first base substrate 101 defining therein plural pixel areas including pixel area PA. The pixel area PA includes a first sub-pixel area PAs1 and a second sub-pixel area PAs2.

A gate line GL and a data line DL crossing the gate line GL are formed on the first base substrate 101. A switching element TR connected to the gate line GL and the data line DL is formed in the pixel area PA. A drain electrode portion of the switching element TR connects to a pixel electrode PE of the pixel area PA. A storage line STL overlaps with the pixel electrode PE and is formed in the pixel area PA.

The switching element TR includes a gate electrode GE, a gate insulation layer 102, a semiconductor layer 130, a source electrode SE and a drain electrode DE. The gate electrode GE is extended from the gate line GL. The gate insulation layer 102 is formed on the gate line GL and the gate electrode GE. The semiconductor layer 130 includes an activation layer 130a doped with impurities and an ohmic contact layer 130b formed on the activation layer 130a. The semiconductor layer 130 is formed on the gate insulation layer 102 of an area where the gate electrode GE is formed. The source electrode SE is extended from the gate line DL formed on the semiconductor layer 130. The drain electrode DE is spaced apart from the source electrode SE formed on the semiconductor layer 130. A contact portion CT is formed in an end portion of the drain electrode DE, and is electrically connected to the pixel electrode PE through the contact portion CT. The contact portion CT includes a contact hole formed through a protective insulation layer 104 formed on the data line DL, the source electrode SE and the drain electrode DE.

The pixel electrode PE is commonly formed to be present in the first and second sub-pixel areas PAs1 and PAs2. The pixel electrode PE includes a first opening pattern OP1 that subdivides the pixel electrode PE into domains.

The storage line STL is formed in a boundary area of the pixel electrode PE, so that the storage line STL is overlapped with an end portion of the pixel electrode PE. For example, the storage line STL is formed in an interval area between the data and gate lines SL and GL and the pixel electrode PE. The storage line STL is formed in an overlapping area of the pixel electrode PE, thereby forming a storage capacitor Cst which is defined by the pixel electrode PE, the storage line STL, the gate insulation layer 102 and the protective insulation layer 104 that are formed between the pixel electrode PE and the storage line STL.

The opposite substrate 200 includes a light passing second base substrate 201 extending through the pixel area PA having the first sub-pixel area PAs1 and a second sub-pixel area PAs2. A light-blocking layer 210, a color filter layer 220, a first common electrode CE1 and a second common electrode CE2 are formed on the second base substrate 201.

The light-blocking layer 210 is formed by a conductive material in correspondence with an area surrounding a boundary of the pixel electrode PE, thereby blocking light from leaking around the PA. For example, the light-blocking layer 210 is formed in correspondence with the data line DL, the gate line GL and the switching element TR that are formed in the array substrate 100. The light-blocking layer 210 may include a double-layer structure. When the light-blocking layer 210 includes the double-layer structure, the light-blocking layer 210 may include a lower chromium (Cr) layer and an upper chromium oxide (CrOx) layer.

The color filter layer 220 is formed in the pixel area PA. For example, the color filter layer 220 may be formed in the pixel area PA defined by the light-blocking layer 210.

The first and second common electrodes CE1 and CE2 are divided from each other by the second opening pattern OP2. The second common electrode CE2 is electrically floated in the pixel area PA so as to define a capacitor plate. The first common electrode CE1 is formed in the first sub-pixel area PAs1, and the second common electrode CE2 is formed in the second sub-pixel area PAs2.

The first common electrode CE1 is connected to a first common electrode CE1 formed in an area adjacent to the pixel area PA to receive the common voltage, Vcom. The second common electrode CE2 is spaced apart from the first common electrode CE1 to be electrically floated. The second common electrode CE2 is partially and insulatively overlapped with the light-blocking layer 210. For example, the second common electrode CE2 includes a first surface area overlapped with the pixel electrode PE and a second surface area overlapped with the light-blocking layer 210.

The opposite substrate 200 further includes a planarizing overcoat layer 203 formed between the color filter layer 220 and the common electrode CE.

The first common electrode CE1 is connected to a first common voltage providing conductor formed in an area adjacent to the pixel area PA to receive the common voltage, Vcom. The second common electrode CE2 is spaced apart from the first common electrode CE1 to be electrically floated. The second common electrode CE2 is partially and insulatively overlapped with the light-blocking layer 210. For example, the second common electrode CE2 includes a first surface area overlapped with the pixel electrode PE and a second surface area overlapped with the light-blocking layer 210.

As described above, an additional floating electrode need not be formed in the array substrate 100 so as to form the coupling capacitor Ccp. Accordingly, an aperture ratio of the pixel area PA need not be reduced by formation of a floating plate on the array substrate 100 and thus light transmittance through the LCD panel may be enhanced.

Figure 4A:
FIGS. 4A to 4C are cross-sectional views illustrating a process for manufacturing the opposite substrate of FIG. 3.
Figure 4B:
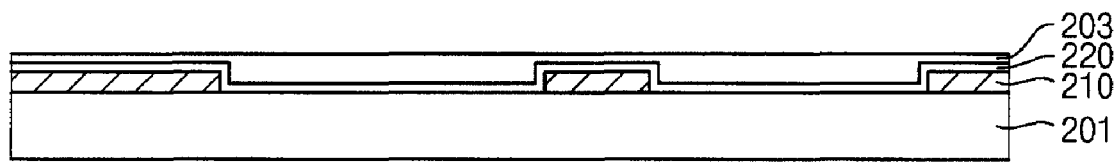
Figure 4C:
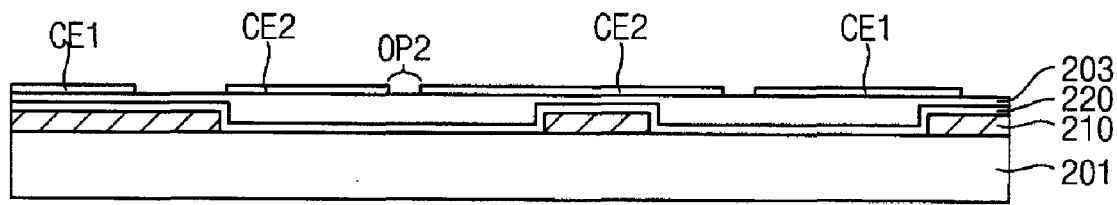

FIGS. 4A to 4C are cross-sectional views illustrating a process for manufacturing the opposite substrate of FIG. 3.

Referring to FIGS. 3 and 4A, an electrically conductive light-blocking layer 210 is formed on the second base substrate 201. FIG. 4A follows the same sectional line I-I' of FIG. 2 as does FIG. 3. The light-blocking layer 210 is formed in correspondence with an area surrounding the pixel electrode PE. The light-blocking layer 210 may include the conductive materials mentioned above. For example, the light-blocking layer 210 is formed in an area corresponding to the data line DL, the gate line GL and the switching element TR that are formed on the array substrate 100. The light-blocking layer 210 may include a double-layer structure. When the light-blocking layer 210 includes the double-layer structure, the light-blocking layer 210 may include a lower chromium (Cr) layer and an upper chromium oxide (CrOx) layer.

Referring to FIGS. 3 and 4B, an electrically insulative color filter layer 220 is formed on the second base substrate 201 having the light-blocking layer 210 formed thereon. The color filter layer 220 is formed in correspondence with the pixel area PA. The color filter layer 220 includes a selected color (e.g., R, G, or B) from a plurality of predefined color filters.

Then, an electrically insulative overcoating layer (planarizing layer) 203 is formed on the second base substrate 201 having the color filter layer 220 formed thereon. The overcoating layer 203 may planarize the second base substrate 201 having the color filter layer 220 formed thereon, and may protect the color filter layer 220. In one embodiment, the planarizing layer 203 is formed of a transparent organic material (e.g. Novolac™).

Referring to FIGS. 3 and 4C, a transparent conductive layer (not shown) is next formed on the second base substrate 201 having the overcoating layer 203 formed thereon. Then, the transparent conductive layer is patterned to form the second opening pattern OP2. A first common electrode CE1 and a second common electrode CE2 that is electrically floated apart from the first common electrode CE1 are formed by the second opening pattern OP2. The first common electrode CE1 is formed in the first sub-pixel area PAs1, and the second electrode CE2 is formed in the second sub-pixel area PAs2.

The first common electrode CE1 is commonly connected to a first common electrode formed in pixel areas adjacent to each other. The second common electrode CE2 is partially overlapped with the electrically conductive light-blocking layer 210 to form the coupling capacitor Ccp. Since there are two insulative layers, 220 and 203, interposed between the second common electrode CE2 and the light-blocking layer 210, leakage resistor Rcp is kept from becoming excessively small.

Figure 5A:
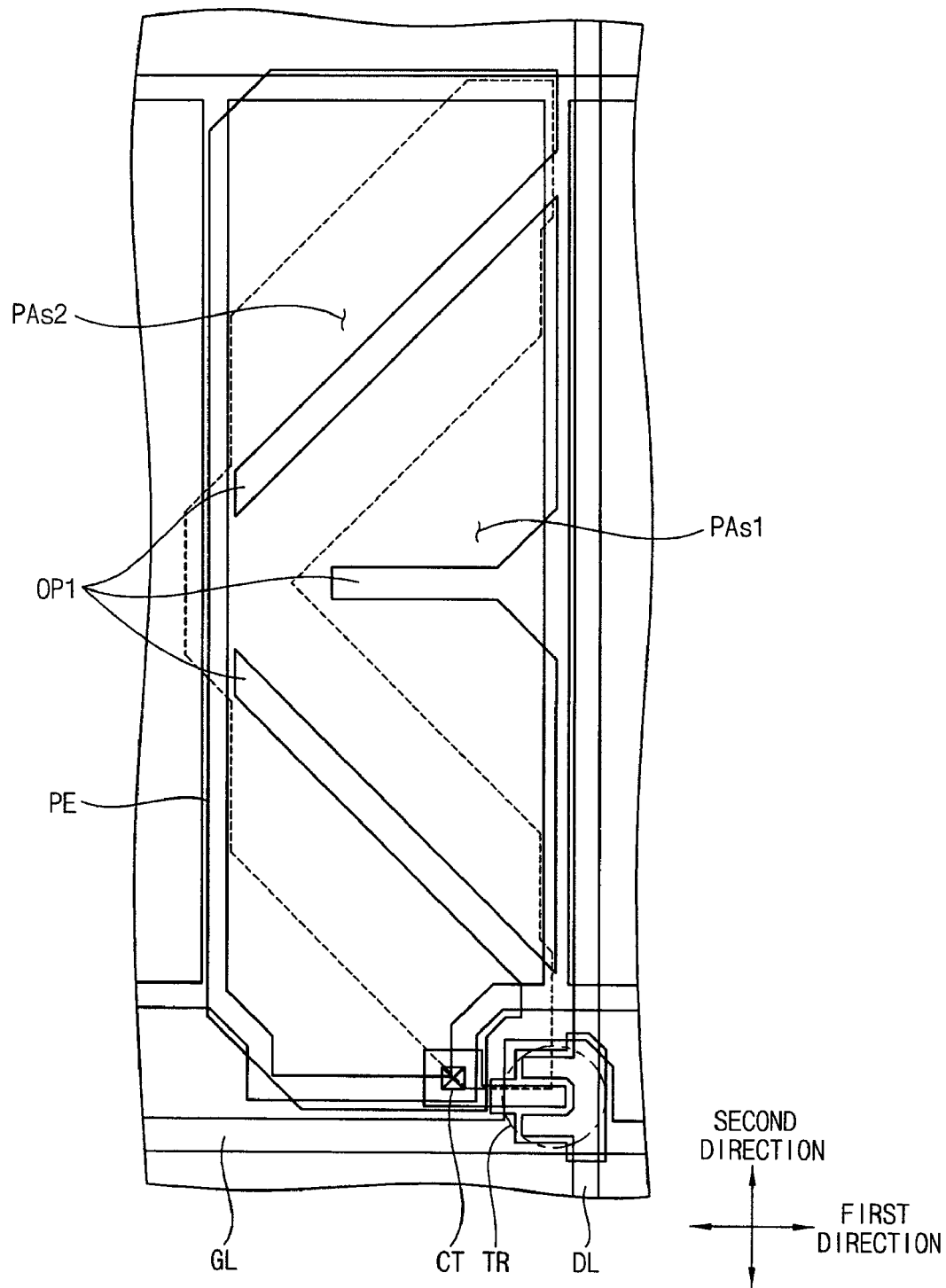
FIG. 5A is a plan view illustrating the array substrate of FIG. 2.
Figure 5B:
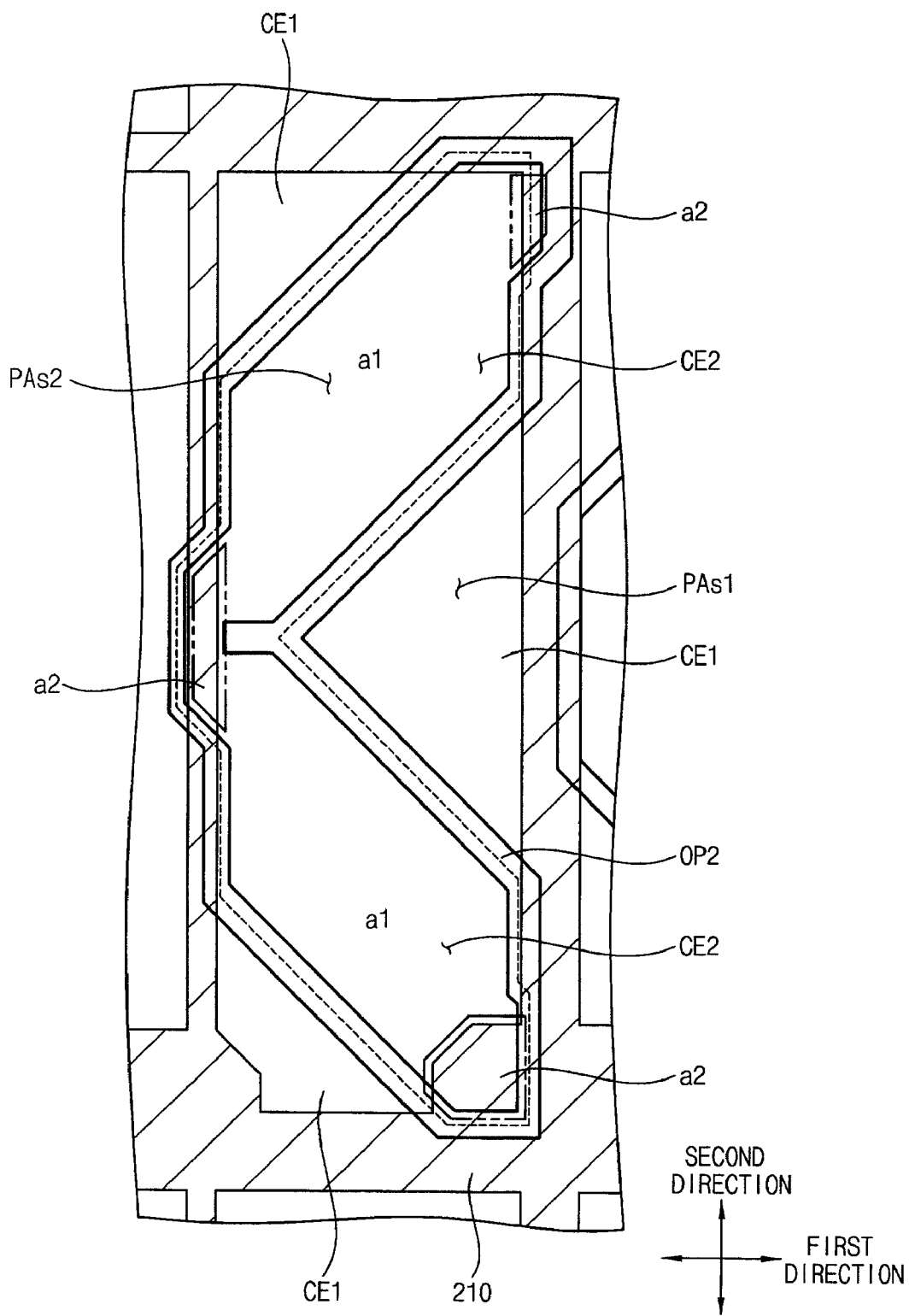
FIG. 5B is a plan view illustrating the opposite substrate of FIG. 2.

FIG. 5A is a plan view illustrating the array substrate of FIG. 2. FIG. 5B is a plan view illustrating the opposite substrate of FIG. 2.

Referring to FIGS. 2 and 5B, the pixel area PA having the first and second sub-pixel areas PAs1 and PAs2 is defined in the array substrate 100. The array substrate 100 includes a gate line GL extended in a first direction and a data line DL extended in a second direction crossing the first direction. A storage line STL is formed in the pixel area PA adjacent to the gate line GL and the data line DL. A common voltage Vcom is applied to the storage line STL.

A switching element TR is formed in an area where the gate line GL and the data line DL are crossed with each other. A gate electrode GE of the switching element TR is extended from the gate line GL, and a source electrode DE of the switching element TR is extended from the data line DL.

A pixel electrode PE is formed in the pixel area PA to be overlapped with an end portion of the storage line STL. The pixel electrode PE is electrically connected to the drain electrode DE of the switching element TR through a contact portion CT. The pixel electrode PE includes a first opening pattern OP1 of a V-shape when viewed from a plan view of the array substrate 100, and is commonly formed in the first and second sub-pixel areas PAs1 and PAs2.

Referring to FIGS. 2, 5A and 5B, the opposite substrate 200 includes a light-blocking layer 210 that is formed in correspondence with the gate line GL, the data line DL, the storage line STL and switching element TR.

The opposite substrate 200 includes a common electrode CE formed on the light-blocking layer 210. The common electrode CE includes a second opening pattern OP2, and the common electrode CE includes a first common electrode CE1 and a second common electrode CE2 that are divided from each other by the second opening pattern OP2. The second opening pattern OP2 has a V-shape that is substantially the same as the shape of the first opening pattern OP1. In the second opening pattern OP2, an opening may be formed to have a looped curve. For example, the second opening pattern OP2 is spaced apart from the first opening pattern OP1 when viewed from a plan view of the opposite substrate 200.

The first common electrode CE1 is formed in the first sub-pixel area PAs1, and the second common electrode CE2 is formed in the second sub-pixel area PAs2. The first common electrode CE1 is connected to a counterpart first common electrode CE1 formed in a pixel area adjacent to the pixel area PA since both are at the Vcom potential. The second common electrode CE2 is spaced apart from the first common electrode CE1 to be floated from the first common electrode CE1.

The second common electrode CE2 has first areas a1 overlapped with the pixel electrode PE of the array substrate 100 and second areas a2 overlapped with the light-blocking layer 210. The second areas a2 of the second common electrode CE2 are overlapped with the light-blocking layer 210 to define the primary capacitance of the coupling capacitor Ccp.

Figure 6A:
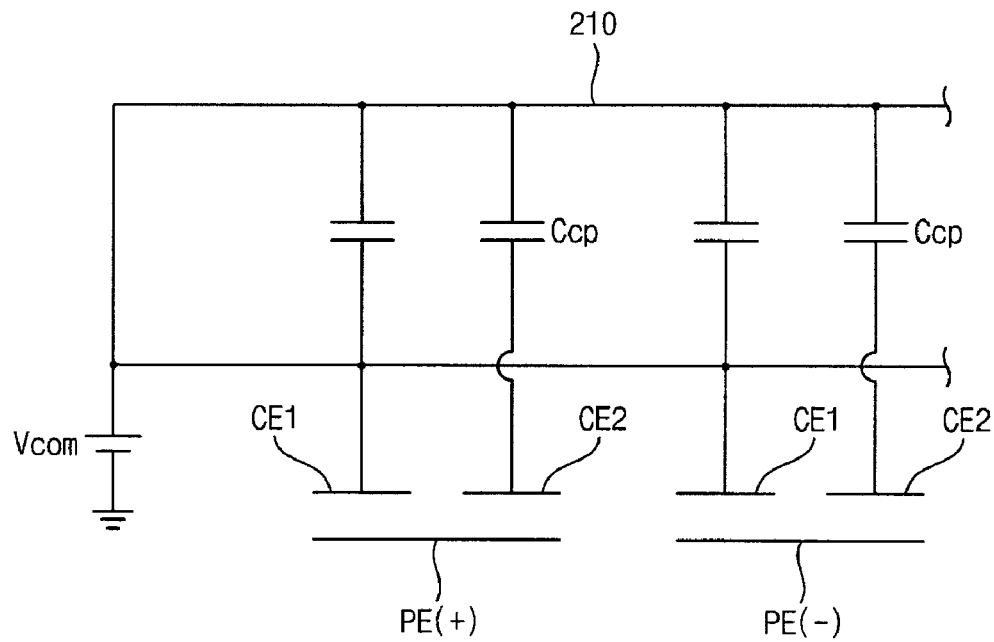
FIGS. 6A and 6B are equivalent circuit diagrams having different connections and which may be obtained with use of the opposite substrate of FIG. 5B.
Figure 6B:
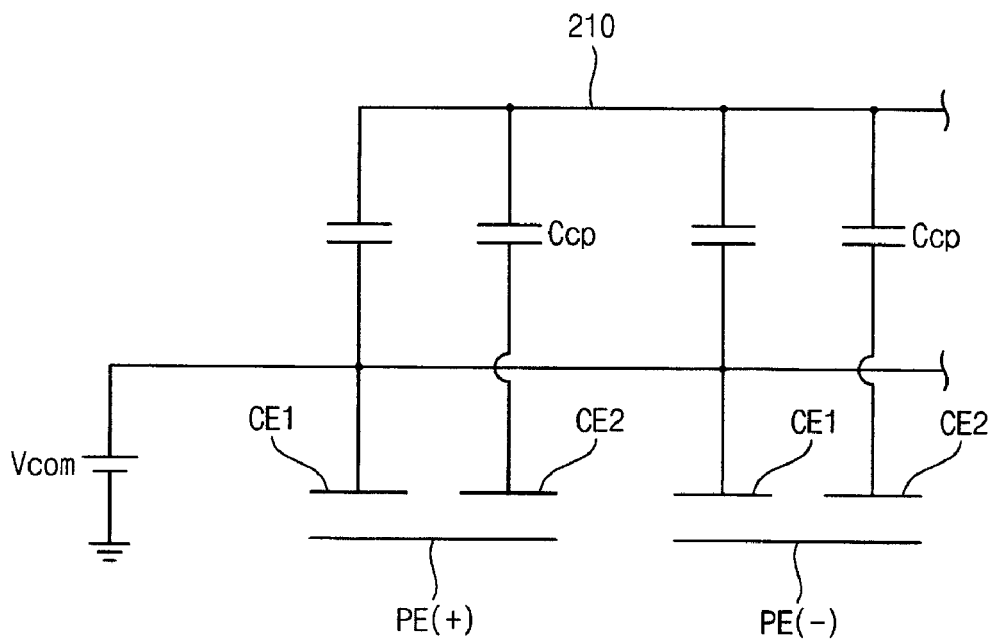

FIGS. 6A and 6B are various equivalent circuit diagrams including one according to the opposite substrate of FIG. 5B.

Referring to FIGS. 5B and 6A, the common voltage, Vcom which is applied directly to the first common electrode CE1 is also directly applied to the light-blocking layer 210. That is, as the coupling capacitor Ccp is defined as an overlapping area between the second common electrode CE2 and the light-blocking layer 210, the common voltage Vcom is directly applied to the light-blocking layer 210. The light-blocking layer 210 has a conductive material, for example Cr/CrOx, so that the light-blocking layer 210 may be employed as a capacitor plate receiving the common voltage Vcom.

Referring to FIGS. 5B and 6B, in this variation the common voltage Vcom is not applied to the light-blocking layer 210. Here instead, the light-blocking layer 210 is charged so it receives a virtual common voltage Vcom'. Formation of the virtual common voltage Vcom' will be described. As a plurality of pixels formed in the LCD panel is driven by an inversion driving method, pixel voltages of a positive polarity and a negative polarity with respect to the common voltage Vcom are charged into adjacent pixels. The virtual common voltage Vcom' develops between series connected ones of the coupling capacitor Ccp, at the node which is situated to define a center voltage between the pixel voltage (PE+) of the positive polarity driven pixel and the pixel voltage (PE−) of the negative polarity driven pixel. The insulated overlap between CE1 and 210 defines an additional capacitance for driving the light-blocking layer 210 toward the virtual common voltage Vcom'.

Figure 7:
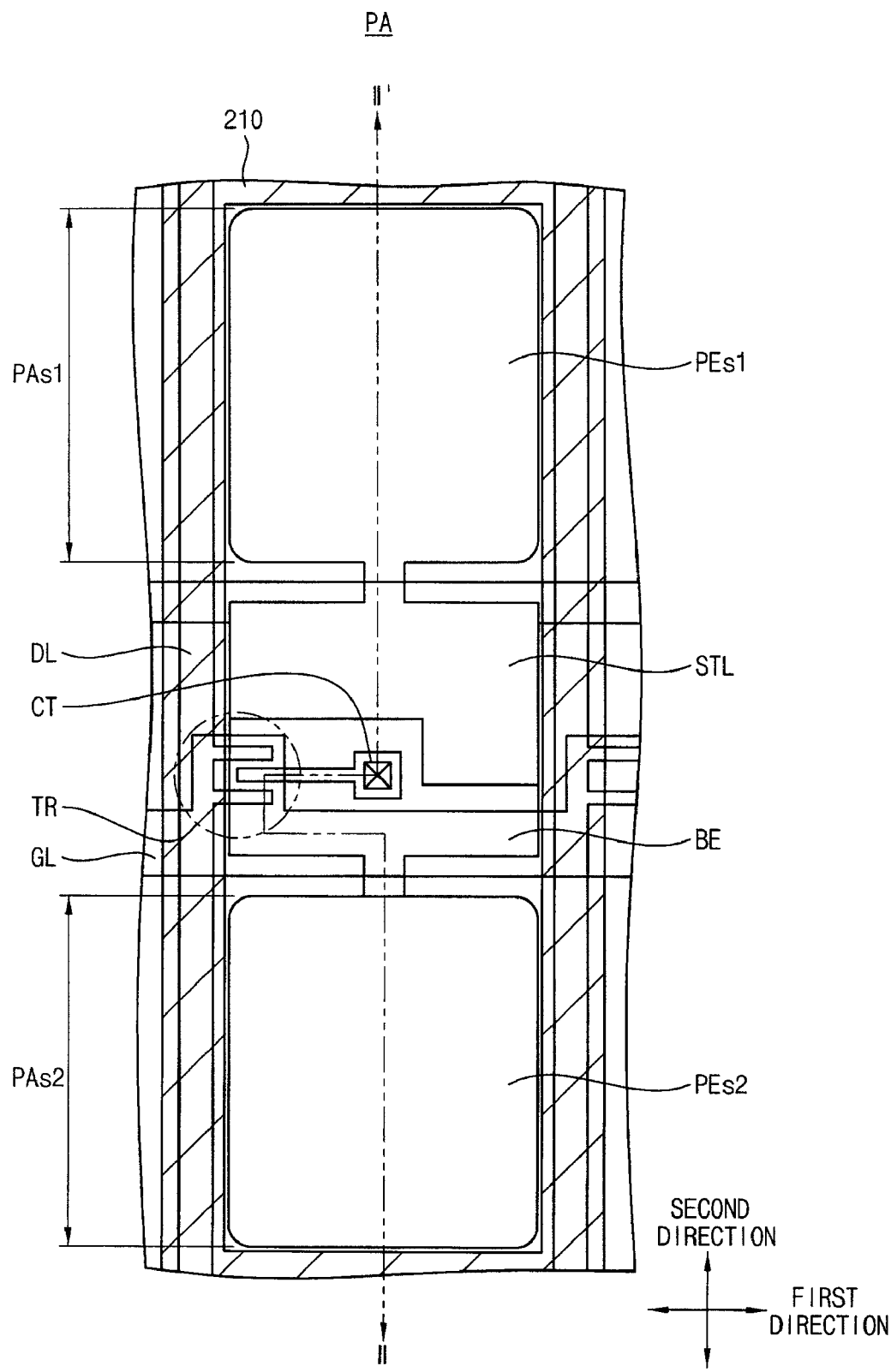
FIG. 7 is a plan view illustrating an LCD panel according to still another embodiment.
Figure 8:
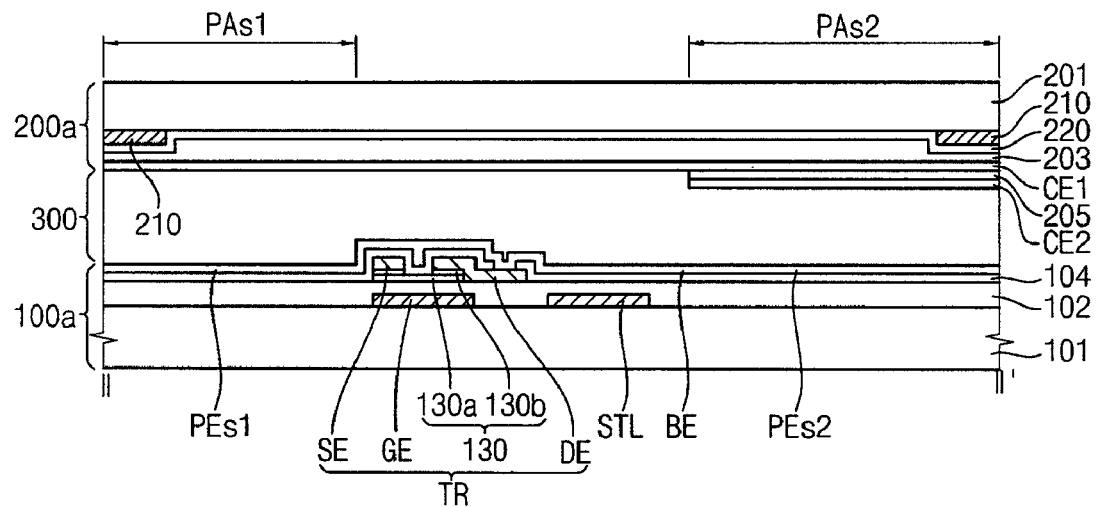
FIG. 8 is a cross-sectional view taken along a line II-II' of FIG. 7.

FIG. 7 is a plan view illustrating an LCD panel according to still another embodiment. FIG. 8 is a cross-sectional view taken along a line II-II' of FIG. 7. In this embodiment, the same reference numbers will be used to refer to the same or like parts as those shown in Embodiment 1.

Referring to FIGS. 7 and 8, the LCD panel includes an array substrate 100a, an opposite substrate 200a and a liquid crystal layer 300 formed between the array substrate 100a and the opposite substrate 200a.

The array substrate 100 includes a first base substrate 101 including a pixel area PA. The pixel area PA includes a first sub-pixel area PAs1 and a second sub-pixel area PAs2.

A gate line GL and a data line DL crossing the gate line GL are formed on the first base substrate 101. A switching element TR connects to the gate line GL and the data line DL and a pixel electrode PE connects to the switching element TR. The TR is formed in the pixel area PA. A storage line STL overlaps with the pixel electrode PE and is formed in the pixel area PA in approximately the same central portion of the pixel area PA as is the switching element TR as seen in FIG. 7.

The pixel electrode PE includes a first sub-pixel electrode PEs1, a second sub-pixel electrode PEs2 and a bridge electrode BE that are patterned to extend in different portions of the pixel area PA as is seen in FIG. 7. The first sub-pixel electrode PEs1 is formed in the first sub-pixel area PAs1, the second sub-pixel electrode PEs2 is formed in the second sub-pixel area PAs2, and the bridge electrode BE is formed between the first and second sub-pixel electrodes PEs1 and PEs2 to connect to the first and second sub-pixel electrodes PEs1 and PEs2. The switching element TR is formed adjacent to the bridge electrode BE and includes a drain electrode (DE) which electrically connects to the bridge electrode BE through a contact portion CT.

The storage line STL is formed in an area between the first sub-pixel area PAs1 and the second sub-pixel area PAs2, that is, adjacent to the switching element TR. The storage line STL is formed to be overlapped with the bridge electrode BE as shown in FIG. 8. A gate insulation layer 102 and a protective insulation layer 104 that are formed between the storage line STL and the bridge electrode BE may define a storage capacitor Cst.

The opposite substrate 200a includes a second base substrate 201 where the pixel area PA having the first and second sub-pixel areas PAs1 and PAs2 is defined. A light-blocking layer 210, a color filter layer 220, a first overcoating layer 203, a first common electrode CE1, a second overcoating layer and a second common electrode CE2 are formed on the second base substrate 201. In one embodiment, the first and second overcoating layers 203 and 205 may include a transparent organic material (e.g. Novolac™).

The light-blocking layer 210 is formed in an area where the gate line GL and the data line DL are formed. Alternatively, the light-blocking layer 210 may be formed in correspondence with the gate line GL, the data wring DL, the switching element TR and the storage line STL.

The color filter layer 220 is formed in the pixel area PA.

The first overcoating layer 203 is formed on a second base substrate 201 having the color filter layer 220 formed thereon to protect the color filter layer 220 and to planarize the opposite substrate 200. The first common electrode CE1 is formed on the first overcoating layer 203. That is, the first common electrode CE1 is commonly formed in correspondence with the pixel electrode formed in the pixel area PA, that is, the first and second sub-pixel electrodes PEs1 and PEs2 and the bridge electrode BE are formed of a same conductive layer. The first common electrode CE1 receives a common voltage Vcom. The first common electrode CE1 is commonly connected to a first common electrode formed in a pixel area adjacent to the pixel area PA.

The second overcoating layer 205 is formed on the first common electrode CE1 of the second sub-pixel area PAs2 and in one embodiment, is formed of the same material as the first overcoating layer 203. The second common electrode CE2 is formed under the second overcoating layer 205 as shown in FIG. 8. That is, the second overcoating layer 205 and the second common electrode CE2 are formed on the second sub-pixel area PAs2, and the second common electrode CE2 is thus electrically floated relative to the overlying first common electrode CE1.

The first sub-pixel electrode PEs1, the liquid crystal layer 300 and the first common electrode CE1 define a first liquid crystal capacitor Ccl1. The second sub-pixel electrode PEs2, the liquid crystal layer 300 and the first common electrode CE1 define a second liquid crystal capacitor Ccl2. The first common electrode CE1, the second overcoating layer 205 and the second common electrode CE2 define a coupling capacitor Ccp. That is, a first plate of the coupling capacitor Ccp is floated, and a second plate of the coupling capacitor Ccp is connected to the first common electrode CE1, so that the common voltage Vcom is applied to the coupling capacitor Ccp.

As described, an additional floating electrode or plate need not be formed in the array substrate 100a in order to form the coupling capacitor Ccp. Since area is not consumed for forming such a floating electrode or plate, an aperture ratio of the pixel area PA may be enhanced.

Figure 9A:
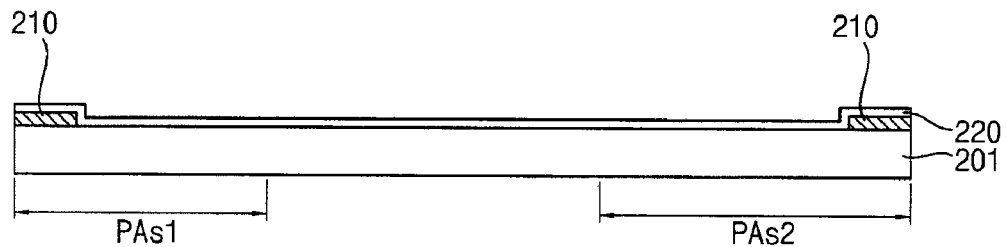
FIGS. 9A to 9C are cross-sectional views illustrating a process for manufacturing an opposite substrate of FIG. 8.
Figure 9B:
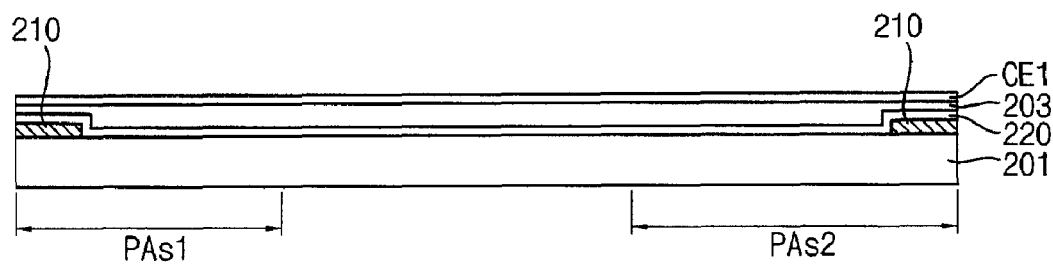
Figure 9C:
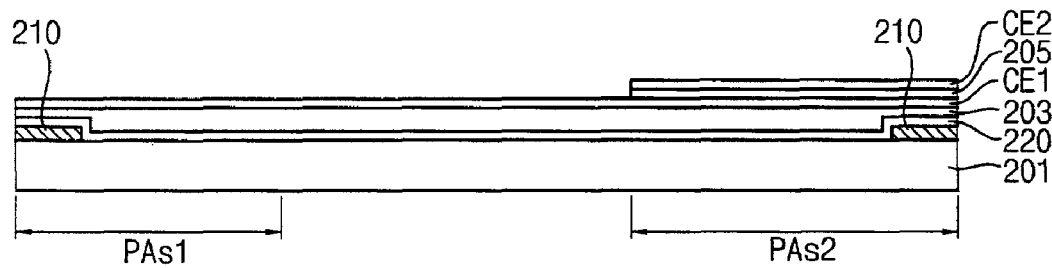

FIGS. 9A to 9C are cross-sectional views illustrating a process for manufacturing an opposite substrate of FIG. 8.

Referring to FIGS. 7, 8 and 9A, a light-blocking layer 210 of a conductive material or a nonconductive material is formed on the second base substrate 201. The light-blocking layer 210 is formed in a boundary area of the pixel electrode PE. The pixel electrode PE includes a first pixel electrode PEs1, a second sub-pixel electrode PEs2 and a bridge electrode BE. For example, the pixel electrode PE is formed in an area where the data line DL and the gate line GL are formed on the array substrate 100. Alternatively, the pixel electrode PE may be further formed in an area where the switching element TR and the storage line STL are formed.

A color filter layer 220 is formed on the second base substrate 201 having the light-blocking layer 210 formed thereon. The color filter layer 220 is formed in correspondence with the pixel area PA. The color filter layer 220 includes a plurality of color filters.

Referring to FIGS. 8 and 9B, a first overcoating layer 203 is formed on the second base substrate 201 having the color filter layer 220 formed thereon. The first overcoating layer 203 planarizes the second base substrate 201 having the color filter layer 220 formed thereon, and protects the color filter 220.

The first common electrode CE1 formed as a transparent conductive layer is provided on the second base substrate 201 having the first overcoating layer 203 formed thereon. The first common electrode CE1 is formed in the pixel area PA, and is commonly formed in a plurality of pixel areas that are defined in the second base substrate 201.

Referring to FIGS. 8 and 9C, a second overcoating layer 205 is formed on the second base substrate 201 having the first common electrode CE1 formed thereon. The second common electrode CE2 formed as a transparent conductive layer is provided on the second base substrate 201 having the second overcoating layer 205 formed thereon. The second common electrode CE2 is formed on the second sub-pixel area PAs2. That is, the second overcoating layer 205 and the second common electrode CE2 are deposited on the second sub-pixel area PAs2 to form the coupling capacitor Ccp. The second common electrode CE2 is floated.

Figure 10A:
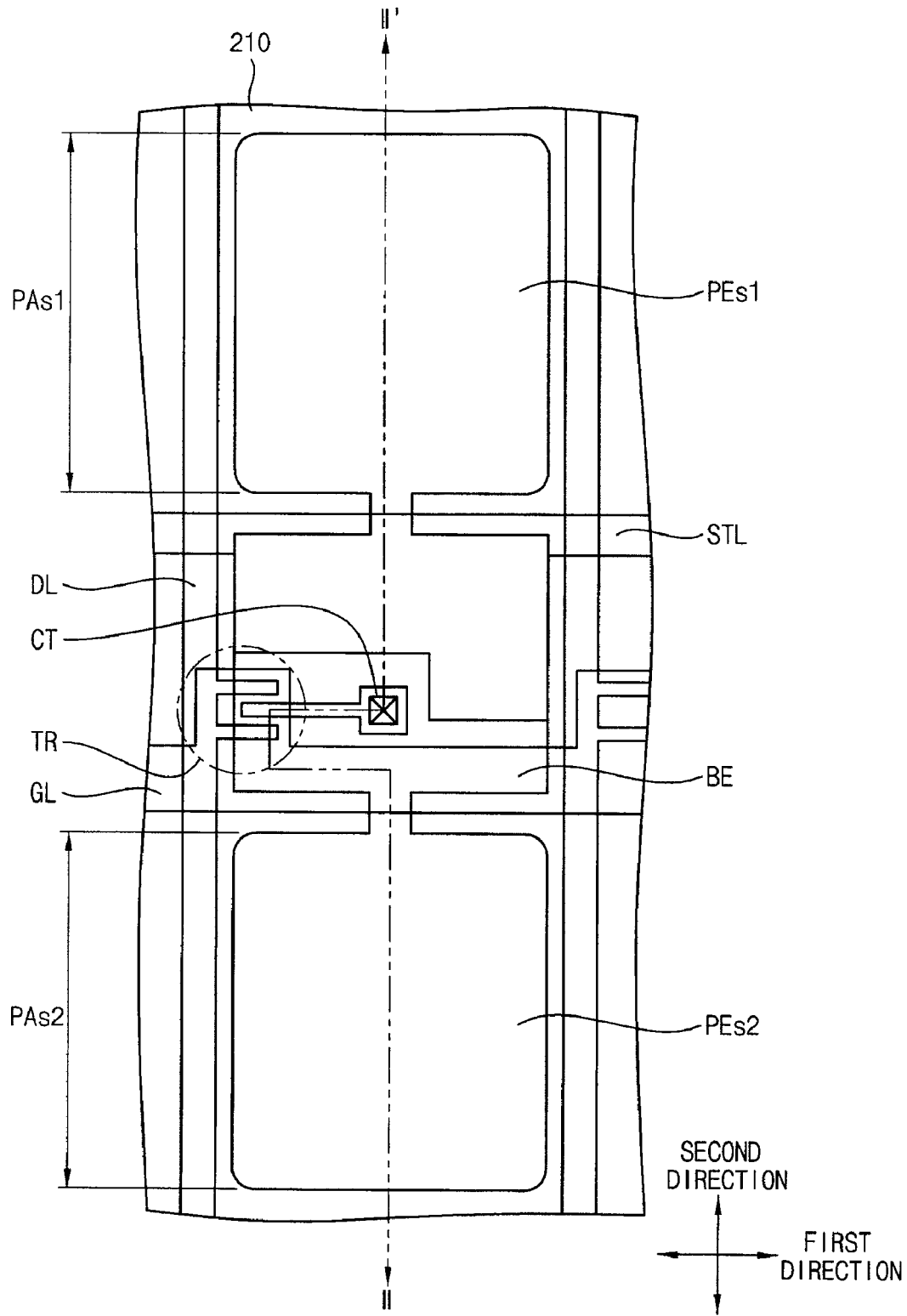
FIG. 10A is a plan view illustrating the array substrate of FIG. 8.
Figure 10B:
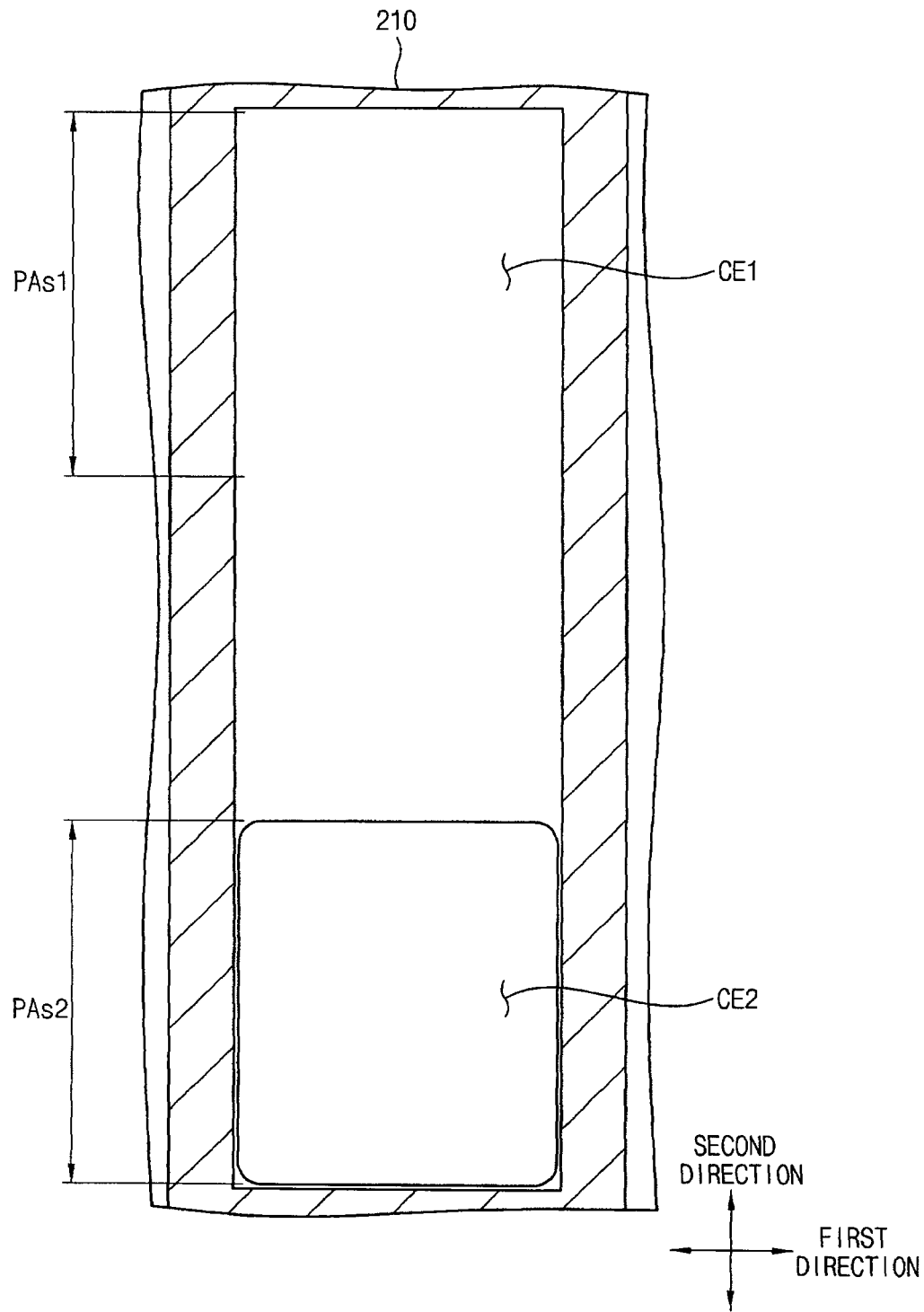
FIG. 10B is a plan view illustrating the opposite substrate of FIG. 8.

FIG. 10A is a plan view illustrating the array substrate of FIG. 8. FIG. 10B is a plan view illustrating the opposite substrate of FIG. 8.

Referring to FIGS. 8 and 10A, the pixel area PA having the first and second sub-pixel areas PAs1 and PAs2 is defined in the array substrate 100a. The array substrate 100a includes a gate line GL extended in a first direction and a data line DL extended in a second direction crossing the first direction. The switching element TR is formed in an area where the gate line GL and the data line DL are crossed with each other. A storage line STL is formed in the pixel area PA adjacent to the switching element TR.

The first sub-pixel electrode PEs1 is formed in the first sub-pixel area PAs1, and the second sub-pixel electrode PEs2 is formed in the second sub-pixel area PAs2. The bridge electrode BE is formed between the first and second sub-pixel electrodes PEs1 and PEs2 to connect to the first and second sub-pixel electrodes PEs1 and PEs2. The switching element TR is formed adjacent to the bridge electrode BE to be electrically connected to the bridge electrode BE through a contact portion CT.

For example, the bridge electrode BE is overlapped with the storage line STL, and the bridge electrode BE is electrically connected to a drain electrode of the switching element TR through the contact portion CT.

Referring to FIGS. 8, 10A and 10B, a light-blocking layer 210 is formed in an area corresponding to the gate line GL and the data line DL on the opposite substrate 200a. The light-blocking layer 210 includes a conductive material or a non-conductive material.

A first common electrode CE1 is formed in an area corresponding to the first and second sub-pixel electrodes PEs1 and PEs2 and the bridge electrode BE. A second common electrode CE2 is overlapped with the first common electrode CE1 in the second sub-pixel area PAs2. The second common electrode CE2 may be a floating electrode. A second overcoating layer 205 is formed between the first and second common electrodes CE1 and CE2. Thus, a coupling capacitor Ccp is defined by the first common electrode CE1, the second overcoating layer 205 and the second common electrode CE2.

According to embodiments of the present disclosure, a coupling capacitor is formed in an opposite substrate of a CC-SPVA mode LCD panel, so that an aperture ratio may be enhanced. Moreover, afterimages may be reduced or prevented.

The foregoing is illustrative of the present disclosure and is not to be construed as limiting thereof. Although a few example embodiments have been described, those skilled in the pertinent art will readily appreciate that many modifications are possible in the example embodiments without materially departing from the novel teachings and advantages disclosed here. Accordingly, all such modifications are intended to be included within the scope of the present disclosure. In the claims, means-plus-function clauses are intended to cover the structures described herein as performing the recited function and not only structural equivalents but also equivalent structures. Therefore, it is to be understood that the foregoing is illustrative and is not to be construed as limited to the specific example embodiments disclosed, and that modifications to the disclosed example embodiments, as well as other example embodiments, are intended to be included within the scope of the disclosure.

What is claimed is:

1. A liquid crystal display (LCD) panel comprising:
an array substrate including a pixel electrode formed in a pixel area where the pixel electrode is subdivided to include a first sub-pixel portion formed in a first sub-pixel area and a second sub-pixel portion connected to the first sub-pixel portion and formed in a second sub-pixel area; and
an opposite substrate disposed in spaced apart relation to the array substrate so as to receive a liquid crystal material therebetween, the opposite substrate including an electrically conductive material layer coupled to receive a common voltage, a first common electrode formed in correspondence with the first sub-pixel area and electrically connected to the conductive material layer, and a second common electrode that is electrically floated relative to the conductive material layer and relative to the first common electrode and is formed in correspondence with the second sub-pixel area so as to define a coupling capacitance interposed between the second sub-pixel portion and a common voltage providing part of the conductive material layer.

2. The LCD panel of claim 1, wherein the first common electrode and the second common electrode are formed as coplanar portions of a same layer but are spaced apart from one another by a common layer opening pattern defined in said same layer.

3. The LCD panel of claim 2, wherein the common layer opening pattern is laterally spaced apart from a second opening pattern formed in the pixel electrode when viewed from a plan view.

4. The LCD panel of claim 2, wherein the electrically conductive material layer of the opposite substrate is disposed to function as light-blocking layer in correspondence with a peripheral area of the pixel electrode.

5. The LCD panel of claim 4, further comprising an overcoating layer formed between the light-blocking layer and the second common electrode.

6. The LCD panel of claim 5, wherein the second common electrode is partially overlapped with the light-blocking layer.

7. The LCD panel of claim 1, wherein
the first common electrode is commonly formed in correspondence with the first and second sub-pixel areas, and
the second common electrode is formed in the second sub-pixel area to be overlapped with the first common electrode.

8. The LCD panel of claim 7, further comprising an overcoating layer formed between the first common electrode and the second common electrode.

9. The LCD panel of claim 1, wherein the array substrate further comprises a storage line formed between the first sub-pixel area and the second sub-pixel area.

10. The LCD panel of claim 9, wherein the pixel electrode further comprises a bridge electrode overlapping with the storage line and connecting the first sub-pixel portion of the pixel electrode and the second sub-pixel portion.

11. The LCD panel of claim 1, wherein the opposite substrate further comprises a color filter layer formed in correspondence with the pixel electrode.

12. A liquid crystal display (LCD) panel comprising:
a first substrate on which a pixel unit is formed, the pixel unit comprising a first subpixel electrode disposed in a corresponding first sub pixel area and a second subpixel electrode disposed in a corresponding second sub pixel area;
a second substrate opposing the first substrate with a liquid crystal layer being provided therebetween;
a first liquid crystal capacitor formed in correspondence with the first subpixel electrode;
a second liquid crystal capacitor formed in correspondence with the second subpixel electrode and disposed parallel to the first liquid crystal capacitor; and,
a coupling capacitor formed in correspondence with the first subpixel area, and series connected to the first liquid crystal capacitor,
wherein the coupling capacitor comprises at least two conductive layers formed on the second substrate.

13. The LCD panel of claim 12, wherein the at least two conductive layers comprises:
a conductive light blocking layer; and
a first common electrode formed on different layer from the conductive light blocking layer, and partially overlapping the conductive light blocking layer.

14. The LCD panel of claim 13, further comprising a second common electrode formed on the same layer as the first common electrode, wherein the second common electrode overlaps the second pixel electrode as the liquid crystal layer being therebetween, and the first common electrode overlaps the first subpixel electrode as the liquid crystal layer being therebetween.

15. The LCD panel of claim 12, wherein the at least two conductive layers comprises a first common electrode and a second common electrode formed on a different layer from the first common electrode, and
the first common electrode overlaps the second common electrode.

16. The LCD panel of claim 15, further comprising a first sub pixel electrode formed on the first sub pixel area, and a second sub pixel electrode formed on the second sub pixel area and electrically connected to the first subpixel electrode.

17. The LCD panel of claim 16, wherein the first subpixel electrode overlaps the first common electrodes, and the second subpixel electrode overlaps the second common electrode.

* * * * *